March 30, 1937.        E. SCHEEMAEKER        2,075,664
CREAM SEPARATOR
Filed Jan. 7, 1936        2 Sheets-Sheet 1

Inventor
EMILE SCHEEMAEKER

By  [signature]
Attorney

March 30, 1937. E. SCHEEMAEKER 2,075,664
CREAM SEPARATOR
Filed Jan. 7, 1936 2 Sheets-Sheet 2
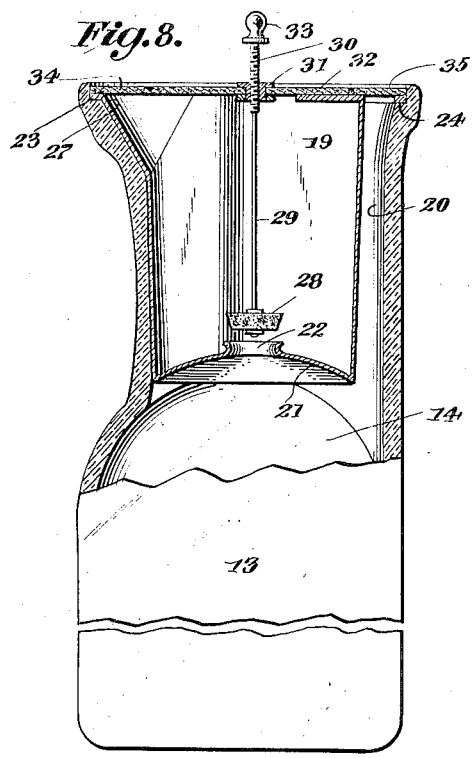
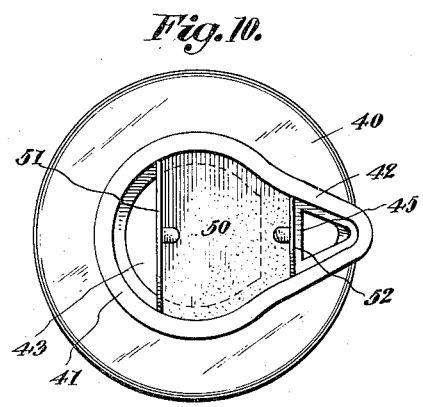
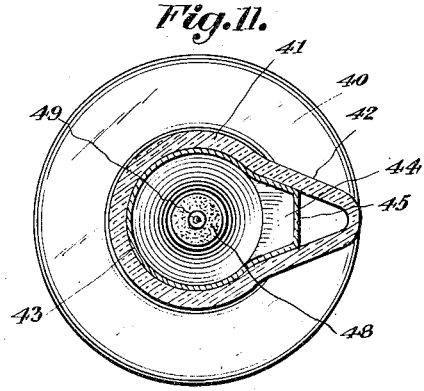
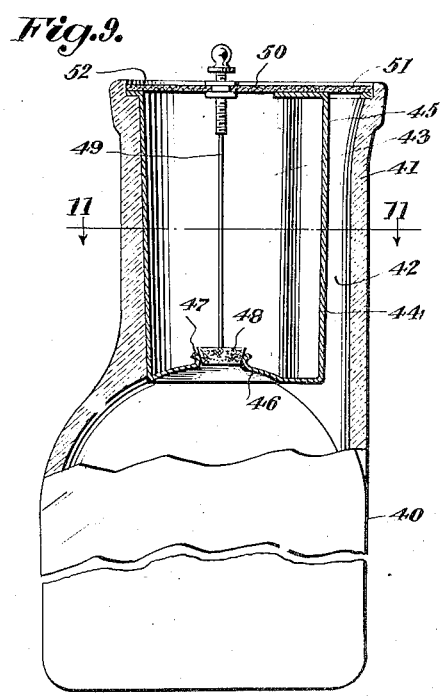
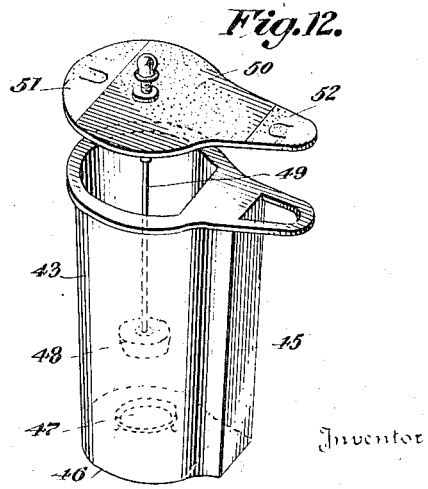
Inventor
EMILE SCHEEMAEKER.

Patented Mar. 30, 1937

2,075,664

UNITED STATES PATENT OFFICE 2,075,664

CREAM SEPARATOR

Emile Scheemaeker, Blackstone, Mass.

Application January 7, 1936, Serial No. 57,970

5 Claims. (Cl. 210—51.5)

The present invention relates to milk bottles and more particularly to a bottle having an attachment, by means of which either milk, or the cream which has risen from the milk, may be poured from the bottle according to the wishes of the user.

It is of course common knowledge that at the time milk is used by individuals, the cream has ordinarily risen and lies in a zone, usually in the neck of the bottle, over the milk which remains in the bottom or body portion. Many devices have been designed, by means of which the cream may be removed separately from the milk.

One object of the present invention is to provide a receptacle which is separate from the body portion of the bottle, and into which the cream will rise, and means for closing off the interior of the receptacle from the body portion of the bottle after the cream has risen.

Another object is to provide means whereby the cream may be poured from the receptacle whenever it is so desired.

Still another object is to provide means whereby the milk may be poured from the milk chamber whenever it is desired without the necessity of first removing the cream.

These objects are accomplished in a practical manner by providing the milk bottle with a cream receptacle which fits into the neck of the bottle, and the bottom of which has an opening through which the cream may enter the chamber and a stopper for the opening which may be inserted after the cream has so risen. A vertical passage is formed between the receptacle and a wall of the bottle neck to connect the lower part of the bottle wherein the milk is contained and the mouth of the bottle. A special closure is provided for the mouth of the bottle, such closure having separately operable means whereby either the cream receptacle or the channel leading to the milk chamber may be opened, thus providing access to either.

In the accompanying drawings:

Figure 8 is an elevation of the preferred embodiment partly in section, said section being taken centrally through the cream receptacle.

Figure 9 is a similar view of a modification.

Figure 10 is a plan view of the modification.

Figure 11 is a sectional view taken on the line 11—11 of Figure 9.

Figure 12 is a perspective view of the modified form of cream receptacle.

Figure 1:
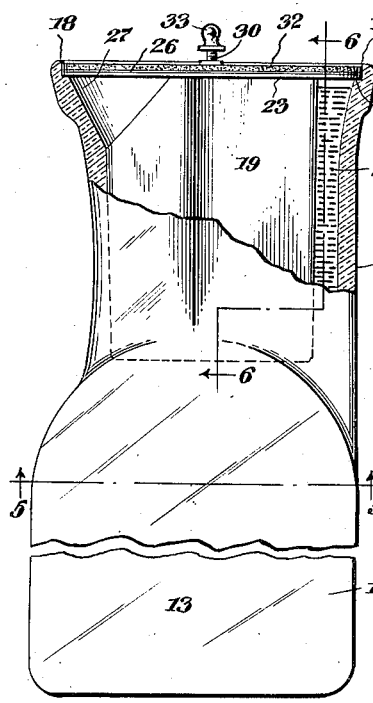
Figure 1 is an elevation partly in section showing a preferred embodiment.
Figure 2:
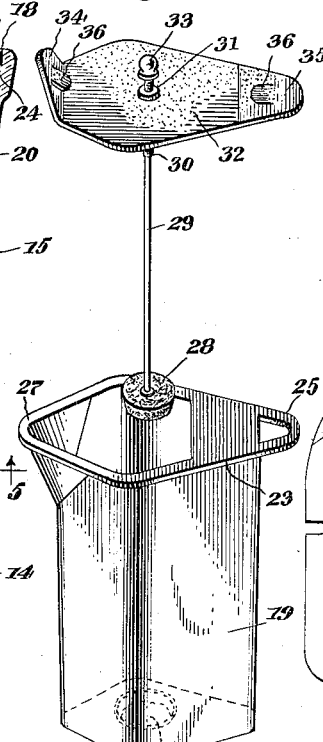
Figure 2 is a perspective view showing the cream receptacle removed from the bottle and the closure in disassembled relation.
Figure 6:
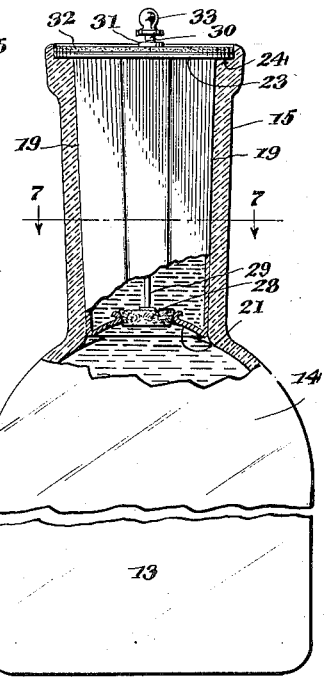
Figure 6 is a sectional view taken on the line 6—6 of Figure 1.
Figure 3:
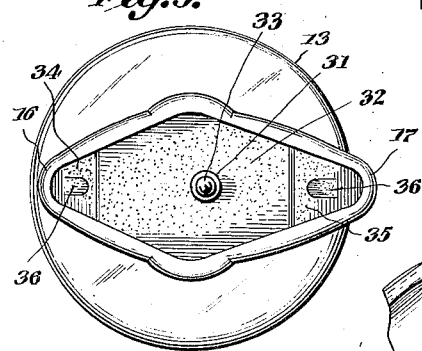
Figure 3 is a top plan view.
Figure 5:
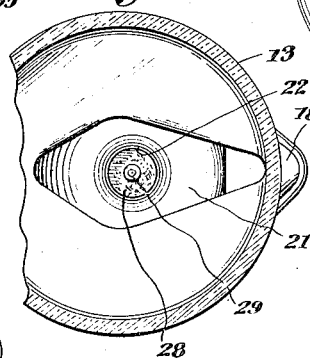
Figure 5 is a sectional view taken on the line 5—5 of Figure 1, and looking in the direction of the arrows.
Figure 7:
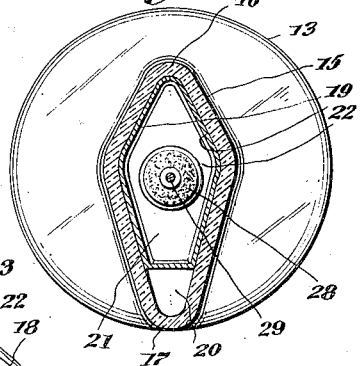
Figure 7 is a sectional view taken on the line 7—7 of Figure 6.
Figure 4:
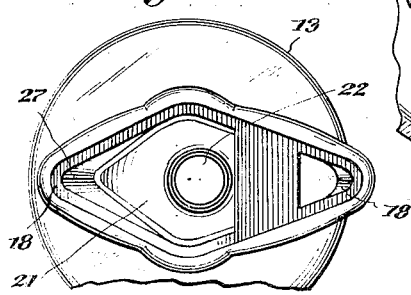
Figure 4 is a plan view showing the closure removed.

Describing the drawings more particularly the bottle 13 may be constructed having a lower or milk-containing portion 14, as is usual with milk bottles, and an upstanding neck 15. The upstanding neck 15, as shown in Figures 1-7 inclusive, may advantageously be formed in substantially the shape of a diamond having two points or apices 16 and 17, respectively. Preferably the bottle walls are outwardly flared near the mouth of the bottle at these apices to form pouring lips 18. For separating the cream from the milk, a cream receptacle is removably positioned in the neck of the bottle. This cream receptacle has side walls 19 arranged in such fashion that when the receptacle is placed in the neck of the bottle the receptacle makes close contact with the inner sides of the neck of the bottle, with the exception that one apex of the receptacle is truncated, so that a passage 20 is left at this point between the receptacle and the interior of the bottle neck and affording a means of exit to the milk in the body portion of the bottle. This receptacle may be made of any suitable material.

The bottom wall 21 of the receptacle has an opening 22 through which the cream may rise into the receptacle. An outwardly extending lip or flange 23 at the top of the receptacle engages a shoulder 24 formed at the mouth of the milk bottle. Preferably this flange extends completely around the mouth of the milk bottle, having an extension in the form of a loop 25 extending beyond the wall 20 for the purpose of forming a continuous seat about the mouth of the bottle for the reception of a closure. The flange 23 serves to position the cream receptacle with respect to the neck of the bottle and serves also as a seat for a gasket 26 which may overlie it. The receptacle may be provided with a lip 27 corresponding to and engaging the interior of one of the lips 18 of the bottle. Preferably the bottom wall 21 is outwardly concaved in order to guide the cream to the port 22.

In order to separate the interior of the receptacle 18 from the bottom portion 14 of the bottle, the following structure is provided. A plug 28 for the opening 22 is mounted on a rod 29 which extends upwardly to a point above the top of the bottle when the plug is positioned in the opening 22. Preferably the top of the rod is threaded as at 30 in order to receive a boss 31 which is secured to a closure 32 of suitable size and shape, to close the mouth of the bottle.

A nut 33 suitably shaped to form a handle may be mounted on the end of the rod. The cover 32 is positioned longitudinally of the rod at the proper point, so that when the plug 28 is positioned in the opening 22, the cover will closely engage the flange 23 of the receptacle 18 in a gasket, as 26, and effectively stop the bottle. The gasket 26 may or may not be necessary, depending on the configuration of the bottle mouth and the material of the cap.

In order to give access to either the cream receptacle or the channel 20, the portions of the closure corresponding to the apices of the diamond shaped neck of the bottle are in the form of flaps 34 and 35 respectively which are hinged to the cover and may be provided with lifting tabs 36.

It is thought that the manner of use of the device will be obvious. The cream receptacle 18 may be inserted in the bottle with the opening or port 22 open. When the cream has risen the rod 29 may be attached to the cover 32 and the plug inserted in the opening 22 with the closure 32 closing the mouth of the bottle and the plug stopping communication between the interior of the receptacle 18 and the body portion 14 of the bottle. Either cream or milk may now be poured into the bottle by opening the proper flap 34 or 35 and tilting the bottle in the proper direction.

In the modified form shown in Figures 9 to 12 inclusive, the milk bottle has a bottom or body portion 40 and an upstanding neck 41, which is substantially round in cross section, as shown in Figure 11, with the exception that it has a substantially V-shaped extension forming a channel 42 extending to one side thereof.

The body of the cream receiving receptacle 43, as shown in Figure 12, is in substantially the form of a cylinder and has a projection 44 on one side that extends into and closes off the channel 42, and the wall 45 of which separates the interior of the channel from the interior of the cream receptacle. The bottom wall 46 of the receptacle has an opening 47 therein similar to the opening 22 of the preferred embodiment, and this is adapted to be closed by a plug 48 mounted on a rod 49 which passes through a cap 50.

The cap 50 is of proper shape and size to effectually close the bottle mouth and it is provided with a flap portion 51 which is hinged to the cover 50, and which gives access to the interior of the cream receptacle. A similarly hinged flap portion 52 overlies the opening of the channel and acts as a closure therefor. The mode of using this modified form is exactly similar to that of the preferred embodiment.

From the foregoing it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim is:

1. The combination with a milk bottle having a body, an upstanding neck and a channel formed in a wall of the said neck and being in communication with the body, of a cream-receiving receptacle insertible in the neck and including a side wall that acts to close off the channel from the neck, and a bottom wall having an opening therein, means for closing the opening, and a cover member for closing the mouth of the bottle, the said cover member having separately operable closures providing outlets for the channel and for the cream-receiving receptacle.

2. The combination with a milk bottle having a body, an upstanding neck and a channel formed in a wall of the said neck and being in communication with the body, of a cream-receiving receptacle insertible in the neck and including a bottom wall having an opening therein and a side wall corresponding with the shape of the neck of the bottle, the said wall closely engaging the wall of the neck when inserted therein and acting to separate the interior of the receptacle from the channel, means for closing the opening in the bottom wall, and a cover member for closing the mouth of the bottle, the said cover member having separately operable closures providing outlets for the channel and for the cream-receiving receptacle.

3. The combination with a milk bottle having a body and an upstanding substantially diamond-shaped neck, of a substantially diamond shaped cream receiving receptacle, removably mounted in the neck, the said receptacle having means to permit cream to enter it and having walls closely adjacent the walls of the neck and having one apex truncated whereby a passage between the wall of the cream receptacle and that of the neck is formed, and a cover member for closing the mouth of the bottle, the said cover member having separately operable closures providing outlets for the passage and for the cream-receiving receptacle.

4. The combination with a milk bottle having a body and an open mouthed upstanding neck having a channel formed in its wall, of a cream-receiving receptacle, removably mounted in the neck and comprising a side wall positioned closely adjacent the wall of the neck and acting to cut off the channel from the receptacle and a bottom wall having an opening therein, a closure for the mouth of the neck and having openings therein communicating respectively with the interior of the cream receptacle and the channel, separately operable closures for the said openings, a plug for closing the opening in the bottom wall of the container, and means connecting the plug and the mouth closure whereby the plug may be positioned in the opening of the bottom wall of the cream receptacle.

5. The combination with a milk bottle having a body portion and an upstanding open mouthed neck, of a cream-receiving receptacle removably positioned in the neck, the said receptacle having a bottom wall provided with an opening, and side walls, one side wall being spaced inwardly from a portion of the neck to form a passage, the remaining walls of the receptacle being closely adjacent and parallel to the wall of the neck, means for closing the opening in the bottom wall, and a cover member for closing the mouth of the bottle, the said cover member having separately operable closures providing outlets for the passage and for the cream-receiving receptacle.

EMILE SCHEEMAEKER.